United States Patent
Miller et al.

(10) Patent No.: US 9,529,661 B1
(45) Date of Patent: Dec. 27, 2016

(54) OPTIMAL MULTI-CORE HEALTH MONITOR ARCHITECTURE

(71) Applicants: Todd E. Miller, Marion, IA (US); Christopher J. Baumler, Hiawatha, IA (US); David J. Radack, Robins, IA (US); Branden H. Sletteland, Marion, IA (US); Greg L. Shelton, Cedar Rapids, IA (US); J. Perry Smith, Shellsburg, IA (US)

(72) Inventors: Todd E. Miller, Marion, IA (US); Christopher J. Baumler, Hiawatha, IA (US); David J. Radack, Robins, IA (US); Branden H. Sletteland, Marion, IA (US); Greg L. Shelton, Cedar Rapids, IA (US); J. Perry Smith, Shellsburg, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 25 days.

(21) Appl. No.: 14/743,868

(22) Filed: Jun. 18, 2015

(51) Int. Cl.
G06F 11/07 (2006.01)
G06F 11/30 (2006.01)
G06F 11/34 (2006.01)
G06F 11/14 (2006.01)

(52) U.S. Cl.
CPC ......... *G06F 11/079* (2013.01); *G06F 11/0724* (2013.01); *G06F 11/0751* (2013.01); *G06F 11/0787* (2013.01); *G06F 11/1484* (2013.01); *G06F 11/301* (2013.01); *G06F 11/3024* (2013.01); *G06F 11/3476* (2013.01)

(58) Field of Classification Search
CPC . G06F 11/1484; G06F 11/3476; G06F 11/301; G06F 11/0787; G06F 11/0784; G06F 11/0766
See application file for complete search history.

(56) References Cited

U.S. PATENT DOCUMENTS

| | | | |
|---|---|---|---|
| 6,988,226 B2 | 1/2006 | Koning et al. | |
| 7,774,659 B2 | 8/2010 | Roussel | |
| 2002/0108074 A1* | 8/2002 | Shimooka | G06F 11/0712 714/25 |
| 2002/0124201 A1* | 9/2002 | Edwards | G06F 11/0712 714/5.11 |

(Continued)

FOREIGN PATENT DOCUMENTS

EP 2784676 A1 3/2013

*Primary Examiner* — Yolanda L Wilson
(74) *Attorney, Agent, or Firm* — Angel N. Gerdzhikov; Donna P. Suchy; Daniel M. Barbieri (57) ABSTRACT

A multi-core processor system and a method of operating the system allocates fault queues in a shared system memory for each virtual machine of a partitioned guest operating system running on a core or partition of the processor system. Health monitors of the partitioned guest operating system log faults in the fault queue corresponding to the appropriate virtual machine. The health monitors may take additional action in response to warning-level or virtual machine-level faults. A health monitor of the multi-core processor resource then polls each fault queue, as well as the partition-level and module-level event logs maintained by the module operating system, for available faults and logs all faults in a single nonvolatile event log of the multi-core processor resource.

19 Claims, 5 Drawing Sheets

(56) References Cited

U.S. PATENT DOCUMENTS

| | | | |
|---|---|---|---|
| 2002/0124214 A1* | 9/2002 | Ahrens, Jr. | G06F 11/0712 714/57 |
| 2002/0124215 A1* | 9/2002 | Austen | G06F 11/0787 714/57 |
| 2003/0056155 A1* | 3/2003 | Austen | G06F 11/0781 714/45 |
| 2004/0139368 A1* | 7/2004 | Austen | G06F 11/0781 714/20 |
| 2006/0143359 A1* | 6/2006 | Dostert | G06F 9/544 711/6 |
| 2006/0150015 A1* | 7/2006 | Kondajeri | G06F 11/0712 714/23 |
| 2011/0252271 A1* | 10/2011 | Frenkel | G06F 11/0712 714/4.1 |

* cited by examiner

OPTIMAL MULTI-CORE HEALTH MONITOR ARCHITECTURE

BACKGROUND

A multi-core common processing resource (MCPR) may be an ARINC 653-compliant or similar partitioned avionics control environment wherein a processor (or processors) is partitioned into several cores, threads, or other partitions. The processing environment may include a single module operating system (MOS) that provides an event-driven health monitoring framework, and one or more guest operating systems (GOS). Guest operating systems may be partitioned or non-partitioned (i.e., partitioned into one or more virtual machines (VM)), and may correspond to partitions of the MCPR wherein various real-time processes and applications execute. The MOS health monitoring framework allows handling of health monitor events at the process, partition, and module level.

At the module and partition level, event handling may be configured via XML, whereby each event may be mapped to a fault handler. MOS health monitoring provides for both a first module-level fault log and a second fault log for each partition. Both the first and the second fault logs may be RAM-based circular logs. Furthermore, supported events may be either alarms, which need attention and may expect recovery action, or messages, which do not expect recovery action.

A single GOS partition of the MCPR (running a partitioned GOS over n virtual machines) may incorporate, e.g., a partition-level health monitor application at VM 0 and one or more real-time applications running on VM 1 . . . VM n. In the above environment, all faults (ex.—errors) from every virtual machine within a given partition would be logged in the same partition-level fault log of the MOS health monitoring framework. Therefore, a non-critical virtual machine within this partition may flood the fault log with warning-level faults, potentially overwriting critical faults (e.g., VM-level or GOS-level faults of higher severity) from a different virtual machine within the same partition. In addition, the partition-level health monitor may direct the MOS to inject a fault into the module-level event log maintained by the MOS. A non-critical virtual machine of any partitioned GOS may thereby log numerous faults and introduce jitter into the critical faults of other virtual machines throughout the MCPR. It may therefore be desirable to provide a means for multi-level fault logging and management without hindering the module operating system's response to critical faults at the partition/GOS or module levels.

SUMMARY

In one aspect, embodiments of the inventive concepts disclosed herein are directed to a processor system comprising a multi-core processing resource (MCPR) including one or more processors. In one embodiment, the one or more processors include at least one first processor core or partition. For example, the at least one first processor core or partition may include a first virtual machine (VM). The at least one first processor core or partition may include a first health monitor coupled to the first VM. The at least one first processor core or partition may include at least one second VM, the at least one second VM including at least one first application configured to execute on the second VM. In one embodiment, the one or more processors include at least one second processor core or partition, the at least one second processor core or partition including a second health monitor and at least one second application configured to execute on the at least one second processor core or partition. In one embodiment, the processor system includes a shared system memory coupled to the one or more processors, the shared system memory including a first fault log associated with each first VM and each second VM. For example, the at least one first health monitor may be configured to add at least one first fault (which may be a warning, a VM-level fault, or a partition-level fault) to the at least one first fault log. In one embodiment, the processor system includes at least one second fault log coupled to each first processor partition and each second processor partition. For example, the each first health monitor and each second health monitor may be configured to add at least one second fault (which may be a warning or a partition-level fault) to the at least one second fault log. At least one first health monitor may be an MCPR health monitor configured to retrieve first faults from the first fault logs, retrieve second faults from the second fault logs, and store the retrieved faults in a nonvolatile fault log.

In a further aspect, the inventive concepts disclosed herein are directed to a method for fault logging in a processor system including one or more processors. In one embodiment, the method includes adding, via a first health monitor, at least one first fault to a first fault log of a shared system memory coupled to the one or more processors. For example, the first fault log may be associated with a virtual machine (VM) of the one or more virtual machines associated with a first processor core or partition of the one or more processors. In one embodiment, the method includes adding, via a second health monitor, at least one second fault to a second fault log. For example, the second health monitor may be associated with a second processor core or partition of the one or more processors, and the second fault may be associated with either a first processor core or partition or a second processor core or partition. In one embodiment, the method includes executing at least one first action responsive to the first fault via the first health monitor. In one embodiment, the method includes retrieving the first faults from the first fault logs via an MCPR health monitor of a first processor core or partition. In one embodiment, the method includes retrieving the second faults from the second fault logs via the MCPR health monitor. In one embodiment, the method includes storing the retrieved first faults and the retrieved second faults in a nonvolatile fault log of the processor system via the MCPR health monitor.

BRIEF DESCRIPTION OF THE DRAWINGS

The inventive concepts disclosed herein may be better understood by those skilled in the art by reference to the accompanying figures in which.

DETAILED DESCRIPTION

Features of the inventive concepts disclosed herein in their various embodiments are exemplified by the following descriptions with reference to the accompanying drawings, which describe the inventive concepts with further detail. It is to be understood that both the foregoing general description and the following detailed description are exemplary and explanatory only and are not necessarily restrictive of the inventive concepts disclosed and claimed herein. These drawings depict only selected embodiments of the inventive concepts, and should not be considered to limit their scope in any way.

Figure 1:
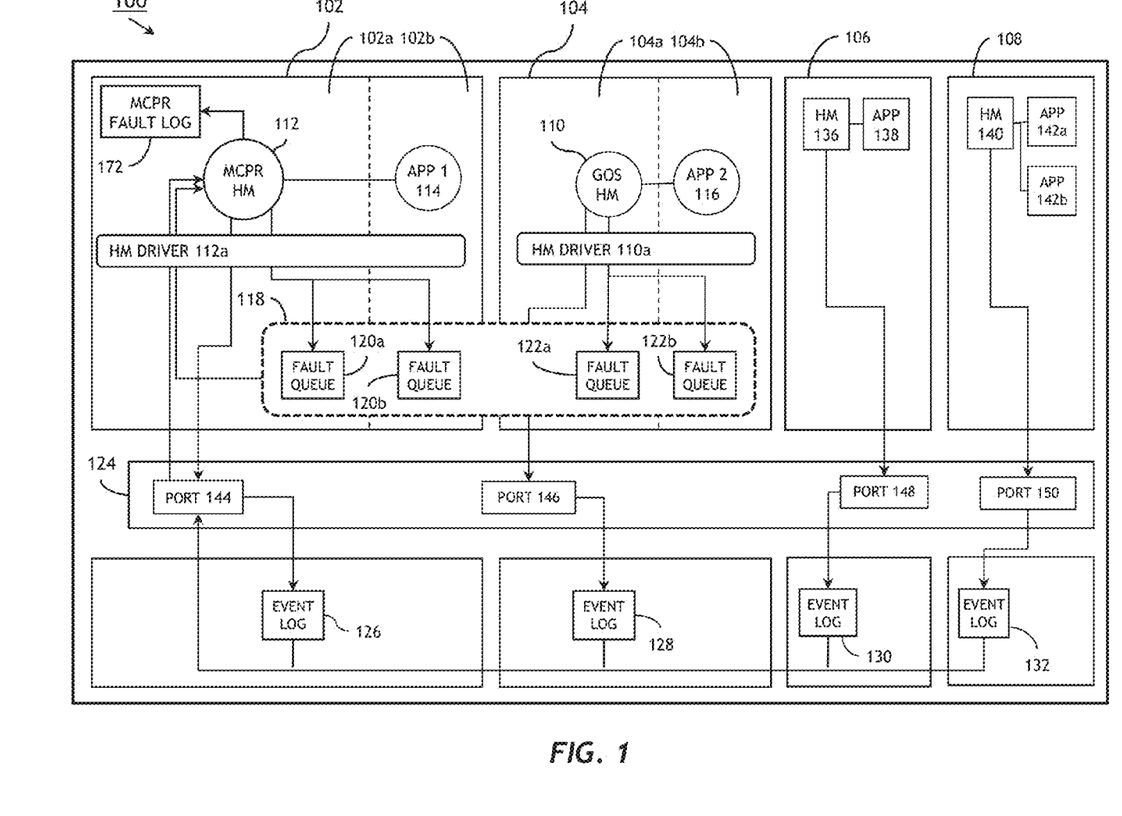
FIG. 1 is a block diagram of a multi-core processor system according to embodiments of the inventive concepts disclosed herein.

FIG. 1 illustrates an embodiment of a partitioned processor system 100 (ex.—Multi-core Common Processing Resource (MCPR)) for an ARINC 653 compliant avionics control system according to the inventive concepts disclosed herein. The partitioned processor system 100 may comprise any number of processors, physical processor cores, or processor partitions. For example, the partitioned processor system 100 may comprise a multi-core processor or group of multi-core processors, each partition thereof including one or more processor cores. The partitioned processor system 100 may comprise a multithreaded processor or group of multithreaded processors, each partition thereof including one or more threads or execution units. Referring to FIG. 1, the partitioned processor system 100 may comprise two cores (ex.—partitions), default core 102 and core 104, each running a partitioned guest operating system (GOS), and two cores 106 and 108, each core running a non-partitioned GOS. For example, each core 102, 104 running a partitioned GOS includes at least a default virtual machine (ex.—VM 0) 102a, 104a as well as one or more virtual machines (ex.—VM 1, VM n) 102b, 104b. Each default virtual machine may include a GOS (ex.—GOS-level, partition-level) health monitor. For example, the default virtual machine 104a (housed on core 104, at VB 1) includes a GOS health monitor 110. However, as the default virtual machine 102a is housed on the default core 102, the default virtual machine 102a houses an MCPR health monitor 112. Both the GOS health monitor 110 and the MCPR health monitor 112 may incorporate a health monitor (HM) driver 110a, 112a. The virtual machines 102b and 104b, running at VM 1 of the cores 102 and 104 respectively, may include one or more applications 114 and 116 configured to execute on the virtual machines 102b, 104b.

The partitioned processor system 100 may additionally include a shared system memory (ex.—shared RAM) 118. For example, the shared system memory 118 may include a dedicated fault queue 120 dedicated to each individual virtual machine in the default core 102, e.g., a fault queue 120a for the default virtual machine 102a and a fault queue 120b for the virtual machine 102b. Similarly, the shared system memory 118 may include a fault queue 122a for the default virtual machine 104a and a fault queue 122b for the virtual machine 104b.

The partitioned processor system 100 may include a module operating system (MOS) 124. The MOS 124 may maintain a dedicated event log for each core or partition of the partitioned processor system 100 so that health monitor events can be handled at the partition or module level. For example, an MOS event log 126 may be dedicated to the default core 102, an MOS event log 128 may be dedicated to the core 104 running a partitioned GOS, and MOS event logs 130, 132 may be dedicated respectively to the cores 106, 108 running a non-partitioned GOS. The MOS 124 may additionally maintain a module-level event log 134 (see FIGS. 2A, 2B) for module-level event handling.

The cores 106, 108 of the partitioned processor system 100 run a non-partitioned GOS and therefore may not incorporate virtual machines. The cores 106 and 108, however, may incorporate partition-level health monitors (HM) associated with the corresponding non-partitioned GOS and include one or more applications configured to execute thereon. For example, the core 106 includes HM 136 and application 138, while the core 108 includes HM 140 and applications 142a, 142b. Each partition-level health monitor 112, 110, 136, 140 of each respective partition 104, 106, 108 may be connected to the corresponding MOS event log 126, 128, 130, 132 for that partition by ports (ex.—partition interfaces) 144, 146, 148, 150. Furthermore, the MCPR health monitor 112 may connected to the MOS event log 126 dedicated to its partition 102 by a port 144. The MCPR health monitor 112 may additionally connect to the MOS event logs 128, 130, 132 of other partitions 104, 106, 108 via the ports 146, 148, 150. The ports 144, 146, 148, 150 may include any combination of physical or virtual ports and interfaces.

Figure 2A:
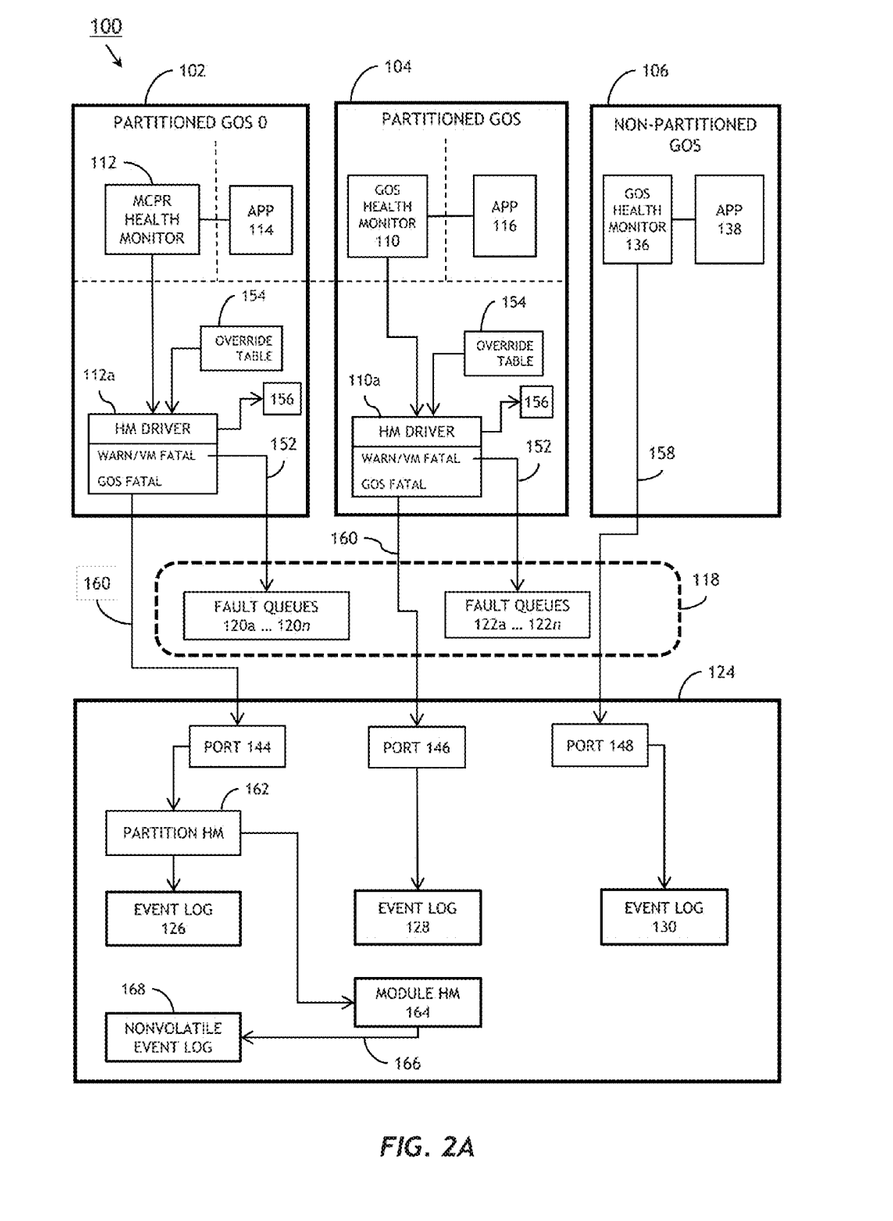
FIGS. 2A and 2B are block diagrams illustrating fault logging in a multi-core processor system according to embodiments of the inventive concepts disclosed herein.

FIG. 2A illustrates how the partitioned processor system 100 logs and handles various types of faults according to embodiments of the inventive concepts disclosed herein. For example, the MCPR health monitor 112 on the default core 102 of the partitioned processor system 100 may log an error (ex.—fault) by writing the fault (152) to a fault queue 120 allocated from the shared system memory 118. This way, the MOS event log 126 associated with the default core 102 need not be flooded with non-critical faults, such as warning faults or VM-fatal faults associated with a particular virtual machine (102a, 102b, 104a, 104b: FIG. 1) rather than an entire partition or core. Furthermore, the MOS 124 does not recognize virtual machines and is therefore unable to distinguish between a first virtual machine 102a, 104a and a second virtual machine 104a, 104b (see FIG. 1). For example, referring also to FIG. 1, the MCPR health monitor 112 of the default core 102 may call its HM driver 112a to log a fault in the appropriate fault queue 120 in the shared memory 118 (e.g., logging a fault associated with the default virtual machine 102a in the fault queue 120a, or logging a fault associated with the virtual machine 102b in the fault queue 120b). Logging a fault in the appropriate fault queue 120a, 120b may include logging an identifier corresponding to the virtual machine 102a, 102b or the first processor partition 102 wherein the fault originated.

The HM driver 112a may additionally override the severity of the fault depending on a severity override table 154 passed to the HM drivers 110a, 112a of partitions 102 and 104 at GOS startup. The severity override table 154 may be generated by an XML-based health monitor fault policy configuration file and provide for additional responsive action (156) taken at the VM or partition level by the HM driver 110a, 112a when a fault is detected. For example, the severity override table 154 may provide that the HM driver 112a will suppress a warning-level fault, but refrain from suppressing any fault of higher severity (i.e., a VM-fatal fault or a GOS-fatal (ex.—partition-fatal, partition-level) fault). Similarly, the HM driver 110a, 112a may elevate the severity of a fault as provided for by the severity override table 154. For example, a warning fault can be upgraded to VM-fatal or a VM-fatal fault upgraded to GOS-fatal. In response to a VM-fatal fault 152, the health monitor 112 may halt or restart the appropriate virtual machine 102b. The HM driver 112a may additionally update the real-time status (RTS) of the virtual machine 102b or the default core 102 concurrent to logging the fault 152 in the fault queue 120b. The HM driver 110a of the core 104, also running a partitioned GOS, may handle and log a fault in the appropriate fault queue 122 in a similar fashion to the HM driver 112a.

If the core 106 is running a non-partitioned GOS, the partition-level GOS health monitor 136 of the core 106 may log a fault in the corresponding partition-level event log 130. For example, either the GOS health monitor 136 of the core 106 may detect the fault, or an application 138 running on the core 106 may report the fault to the GOS health monitor 136. The GOS health monitor 136 may then pass the fault (158) to the appropriate MOS partition-level event log 130 via the appropriate port 148.

If a GOS-level or partition level fault is logged by an HM driver 112a, 110a of a core 102, 104 running a partitioned GOS (e.g., if the HM driver 112a, 110a overrides a warning fault or a VM-fatal fault to GOS-fatal per the severity override table 154) the HM driver 112a, 110a may also pass the fault (160) to the partition-level event log 126, 128 for the appropriate core 102, 104 by invoking the appropriate port 144, 146. Furthermore, if a GOS-level fault 160 is passed to the event log 126 from the default core 102, a partition-level health monitor 162 of the MOS 124 (dedicated to the default core 102) may upgrade the severity of the fault 160 to module-fatal and notify a module-level health monitor 164 of the MOS 124. The partition-level health monitors 162 of the MOS 124 may take additional action if a GOS-level fault 160, 158 is logged in an MOS event log 126, 128, 130. For example, the MOS partition-level health monitor 162 may halt or restart the execution of the GOS associated with the GOS-level fault (i.e., the GOS running on the appropriate core 102, 104, 106). In the alternative, the MOS partition-level health monitor 162 may restart the associated GOS. Similarly, the module-level health monitor 164 of the MOS 124 may take additional action in the event of a module-fatal fault. For example, the module-level health monitor 164 may log the module-fatal fault (166) in a nonvolatile module-level event log 168 of the MOS 124. The module-level health monitor 168 may then restart the processor system 100. The MCPR health monitor 112 may then retrieve the logged fault 166 from the nonvolatile module-level event log 168.

Figure 2B:
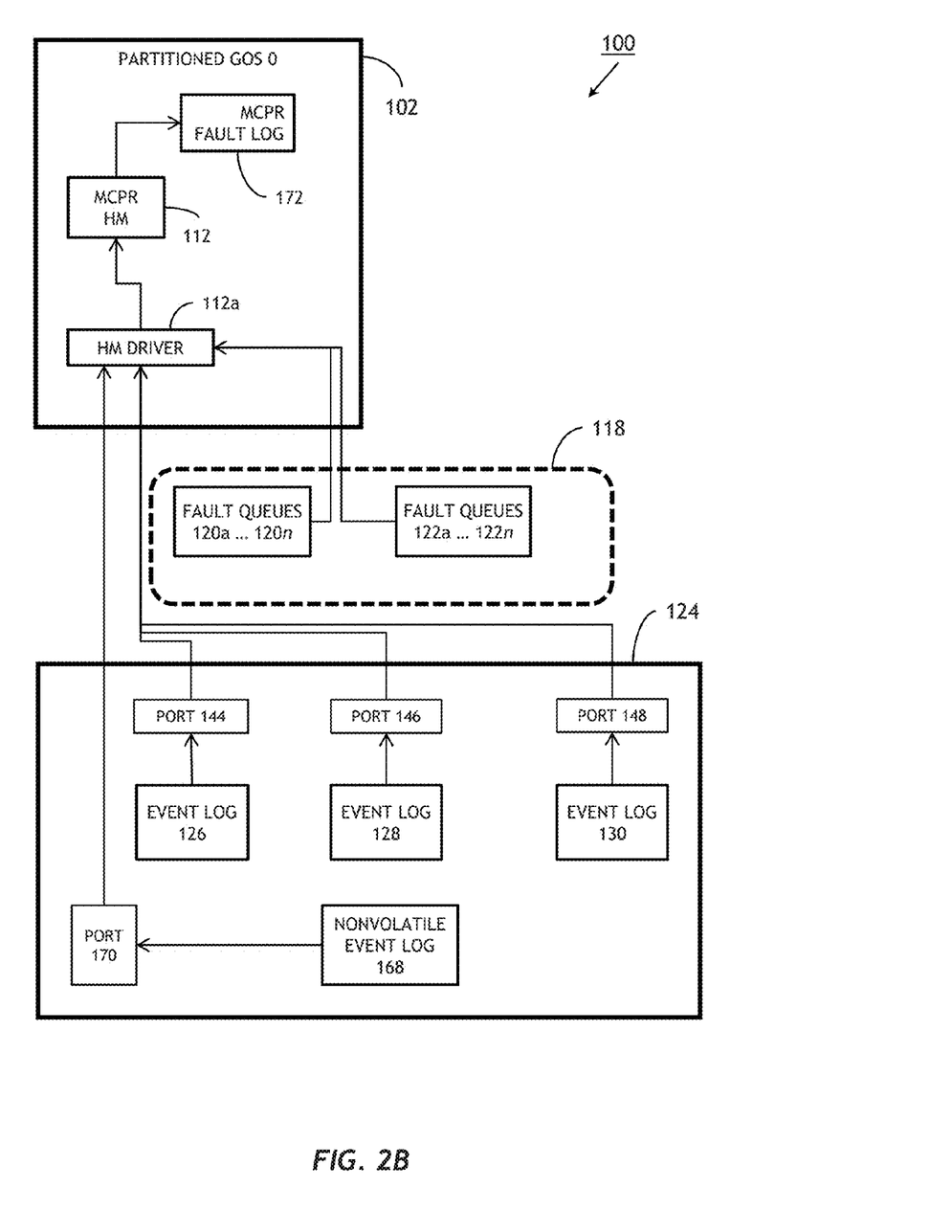

Referring also to FIG. 2B, the MCPR health monitor 112 of the partitioned processor system 100 is responsible for gathering logged faults from each GOS running within the partitioned processor system 100. For example, at intervals the MCPR health monitor 112 may call its HM driver 112a to poll the health monitors 112, 110, 136 of each core 102, 104, 106 of the partitioned processor system 100. The HM driver 112a may know or be able to determine whether a GOS is partitioned (e.g., default core 102 and core 104) or non-partitioned (core 106). Therefore, the HM driver 112a may poll the health monitor 136 of a core 106 non-partitioned GOS (e.g., of core 106) by reading from the appropriate MOS partition-level event log 130 via the corresponding port 148. If the GOS of a core is partitioned, as with default core 102 and core 104, the HM driver 112a may also read the next available fault from each appropriate MOS partition-level event log 126, 128 via the corresponding port 144, 146. However, in the latter cases the HM driver 112a may additionally access the shared system memory 118 to read the next available fault from each fault queue 120 dedicated to a virtual machine of the default core 102 (fault queue 120a dedicated to default VM 102a, fault queue 120b dedicated to VM 102b) and from each fault queue 122 dedicated to a virtual machine of the core 104 (fault queue 122a dedicated to default VM 104a, fault queue 122b dedicated to VM 104b). Finally, the HM driver 112a may additionally poll the module-level event log 168 via port 170 to retrieve any module-level faults 166 logged thereto. The MCPR health monitor 112 may then write all faults retrieved by the HM driver 112a to the nonvolatile fault log 172.

Figure 3A:
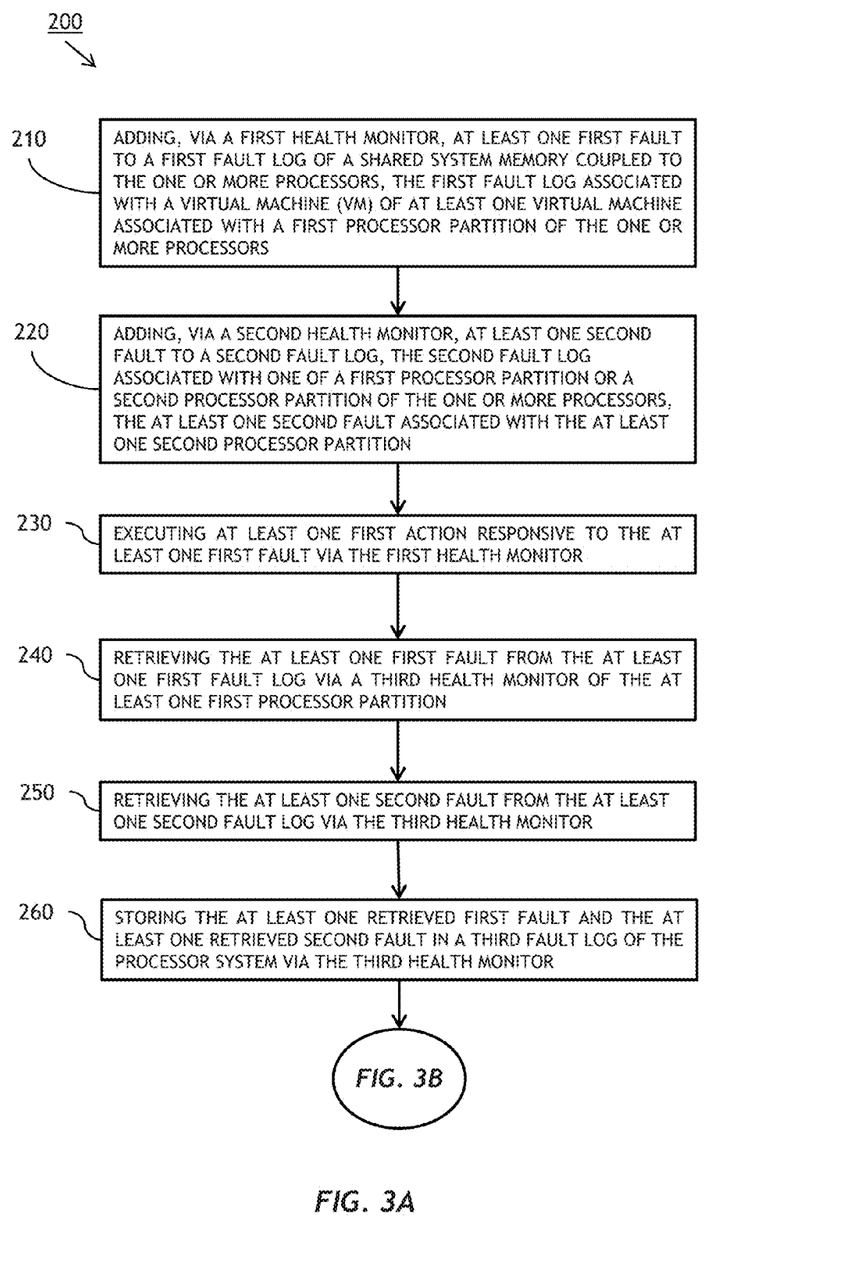
FIGS. 3A and 3B are process flow diagrams for a method of operating a multi-core processor system according to embodiments of the inventive concepts disclosed herein.
Figure 3B:
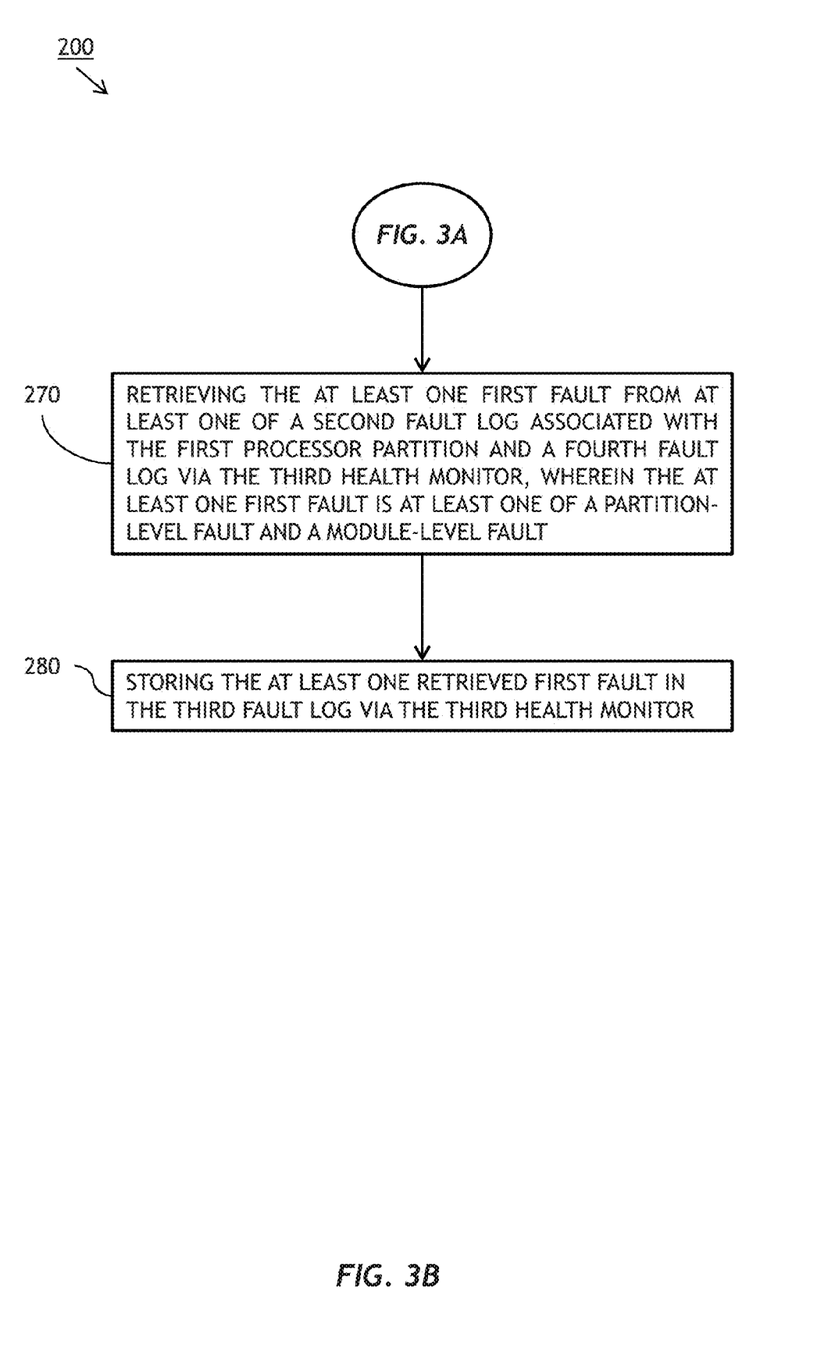

FIGS. 3A and 3B illustrate a method 200 for operating a partitioned processor system 100 including one or more processors according to embodiments of the inventive concepts disclosed herein. At step 210, the first health monitor 110 adds at least one first fault 152 to a first fault log 122b of a shared system memory 118 coupled to the one or more processors, the first fault log 122b associated with a virtual machine (VM) 104b of at least one virtual machine 104a, 104b associated with a first processor partition 104 of the one or more processors. For example, the at least one first fault 152 may be associated with the virtual machine 104b or with a first application 116 configured to execute on the virtual machine 104b. The first health monitor 110 may further update a real-time status of the virtual machine 104b or the first processor partition 104b in the at least one first fault log 122b.

At step 220, the second health monitor 136 of a second processor partition 106 adds at least one second fault 158 to a second fault log 130, the at least one second fault 158 associated with the second processor partition 106.

At step 230, the first health monitor 110 executes at least one first action 156 responsive to the at least one first fault 152. For example, the first health monitor 110 may suppress (156) the at least one first fault 152 if the at least one first fault 152 is a warning. The first health monitor 110 may override the severity (156) of the at least one first fault 152, based at least on the severity override table 154 of the first processor partition 104. The first health monitor 110 may halt or restart the virtual machine 104b associated with the at least one first fault 152, if the at least one first fault 152 is a virtual machine-level fault. The first health monitor 110 may add the at least one first fault 160 to a second fault log 128 associated with the first processor partition 104, if the at least one first fault 152 is a partition-level fault. Finally, the first health monitor 110 may halt or restart the guest operating system configured to execute on the first processor partition 104, if the at least one first fault 152 is a partition-level fault.

At step 240, the MCPR health monitor 112 retrieves the at least one first fault 152 from each first fault log 120a, 120b, 122a, 122b.

At step 250, the MCPR health monitor 112 retrieves the at least one second fault 158 from the at least one second fault log 126, 128, 130.

At step 260, the MCPR health monitor 112 stores the at least one retrieved first fault 152 and the at least one retrieved second fault 158 in a third fault log 172 of the processor system 100.

In one embodiment, the method 200 includes additional steps 270 and 280. At step 270, the MCPR health monitor 112 retrieves the at least one first fault 160, 166 from at least one of a second fault log 128 associated with the first processor partition 104 and a fourth fault log 168, wherein the at least one first fault is at least one of a partition-level fault 160 and a module-level fault 166.

At step 280, the MCPR health monitor 112 stores the at least one retrieved first fault 160, 166 in the third fault log 172.

While particular aspects of the subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

We claim:

1. A processor system comprising:
   a multi-core processing resource (MCPR) including one or more processors, the one or more processors including
      at least one first processor partition, the at least one first processor partition including (a) a first virtual machine (VM), (b) a first health monitor coupled to the first VM; and (c) at least one second VM, the at least one second VM including at least one first application configured to execute on the second VM;
      at least one second processor partition, the at least one second processor partition including (a) a second health monitor and (b) at least one second application configured to execute on the at least one second processor partition;
   a shared system memory coupled to the one or more processors, the shared system memory including a first fault log associated with each of the first VM and the at least one second VM;
   the at least one first health monitor configured to add at least one first fault to the at least one first fault log;
   a second fault log coupled to each first processor partition and each second processor partition, the at least one first health monitor configured to add at least one first fault to the second fault log coupled to each first processor partition and the at least one second health monitor configured to add at least one second fault to the second fault log coupled to each second processor partition;
   wherein the at least one first health monitor includes at least one MCPR health monitor configured to (1) retrieve the at least one first fault from the at least one first fault log, (2) retrieve the at least one second fault from the at least one second fault log, and (3) store the at least one first fault and the at least one second fault in a third fault log.

2. The processor system of claim 1, wherein the at least one first fault includes at least one of a warning, a VM-level fault associated with one of the at least one first VM and the at least one second VM, and a partition-level fault associated with the first processor partition.

3. The processor system of claim 2, wherein the at least one first health monitor is configured to execute at least one action responsive to the at least one first fault.

4. The processor system of claim 3, wherein the at least one first fault is a warning and the at least one first health monitor is configured to suppress the at least one first fault.

5. The processor system of claim 3, wherein the at least one first fault is a VM-level fault and the at least one first health monitor is configured to
   restart the at least one of the at least one first VM and the at least one second VM with which the at least one first fault is associated; and
   halt the at least one of the at least one first VM and the at least one second VM with which the at least one VM-level fault is associated.

6. The processor system of claim 3, wherein the at least one first fault is a partition-level fault; and the at least one first health monitor is configured to
   add the at least one first fault to the second fault log coupled to the first processor partition;
   halt at least one operating system configured to run on the first processor partition; and
   restart at least one operating system configured to run on the first processor partition.

7. The processor system of claim 3, wherein the at least one first health monitor is configured to override the severity of the at least one first fault.

8. The processor system of claim 7, wherein the at least one first health monitor is configured to override the severity of the at least one first fault based at least on a fault policy of the first processor partition.

9. The processor system of claim 1, wherein the processor system is embodied in an ARINC 653 compliant avionics system.

10. The processor system of claim 1, wherein
    the one or more processors include one or more multi-core processors, each multi-core processor having at least one processor core;
    the at least one first processor partition includes at least one first processor core; and
    the at least one second processor partition includes at least one second processor core.

11. The processor system of claim 1, wherein
    the one or more processors include one or more multi-threaded processors, each multithreaded processor having at least one of a thread and an execution unit;
    the at least one first processor partition includes at least one of a first thread and a first execution unit; and
    the at least one second processor partition includes at least one of a second thread and a second execution unit.

12. A method for fault logging in a processor system including one or more processors, the method comprising:
    adding, via a first health monitor, at least one first fault to a first fault log of a shared system memory coupled to the one or more processors, the first fault log associated with a virtual machine (VM) of at least one virtual machine associated with a first processor partition of the one or more processors;
    adding, via a second health monitor, at least one second fault to a second fault log, the second fault log associated with one of a first processor partition or a second processor partition of the one or more processors, the at least one second fault associated with the at least one second processor partition;
    executing at least one first action responsive to the at least one first fault via the first health monitor;
    retrieving the at least one first fault from at least one first fault log via a third health monitor of the at least one first processor partition;
    retrieving the at least one second fault from the at least one second fault log via the third health monitor; and
    storing the at least one retrieved first fault and the at least one retrieved second fault in a third fault log of the processor system via the third health monitor.

13. The method of claim 12, wherein adding, via a first health monitor, at least one first fault to a first fault log of a shared system memory of the processor system, the first fault log associated with a virtual machine (VM) of at least one virtual machine associated with a first processor partition of the one or more processors, includes
    adding, via a first health monitor, at least one first fault to a first fault log of a shared system memory of the processor system, wherein the at least one first fault is associated with at least one of the virtual machine and a first application configured to execute on the virtual machine.

14. The method of claim 12, wherein executing at least one first action responsive to the at least one first fault via the first health monitor includes:
    suppressing the at least one first fault via the first health monitor, wherein the at least one first fault is a warning.

15. The method of claim 12, wherein executing at least one first action responsive to the at least one first fault via the first health monitor includes:
  overriding the severity of the at least one first fault.

16. The method of claim 15, wherein overriding the severity of the at least one first fault includes:
  overriding the severity of the at least one first fault based at least on a fault policy of the at least one first processor partition.

17. The method of claim 12, wherein executing at least one first action responsive to the at least one first fault via the first health monitor includes at least one of:
  restarting the virtual machine, wherein the at least one first fault is a VM-level fault;
  halting the virtual machine, wherein the at least one first fault is a VM-level fault.

18. The method of claim 12, wherein executing at least one first action responsive to the at least one first fault via the first health monitor includes at least one of:
  adding the at least one first fault to a second fault log associated with the first processor partition, wherein the at least one first fault is a partition-level fault;
  halting a first operating system configured to execute on the at least one first processor partition, wherein the at least one first fault is a partition-level fault; and
  restarting a first operating system configured to execute on the at least one first processor partition, wherein the at least one first fault is a partition-level fault.

19. The method of claim 18, further comprising:
  retrieving the at least one first fault from at least one of a second fault log associated with the first processor partition and a fourth fault log via the third health monitor, wherein the at least one first fault is at least one of a partition-level fault and a module-level fault; and
  storing the at least one retrieved first fault in the third fault log via the third health monitor.

* * * * *